(12) United States Patent
Morfino

(10) Patent No.: US 6,615,102 B1
(45) Date of Patent: Sep. 2, 2003

(54) PROCESS AND SYSTEM FOR COMPENSATING STATIC ERRORS ON NUMERICALLY CONTROLLED MACHINE TOOLS

(75) Inventor: Giuseppe Morfino, Pino Torinese (IT)

(73) Assignee: Fidia S.p.A., San Mauro Torinese (IT)

( * ) Notice: Subject to any disclaimer, the term of this patent is extended or adjusted under 35 U.S.C. 154(b) by 0 days.

(21) Appl. No.: 09/743,359

(22) PCT Filed: Jul. 5, 1999

(86) PCT No.: PCT/IT99/00205

§ 371 (c)(1),
(2), (4) Date: Jan. 9, 2001

(87) PCT Pub. No.: WO00/03312

PCT Pub. Date: Jan. 20, 2000

(30) Foreign Application Priority Data

Jul. 10, 1998 (IT) .......................................... TO98A0606

(51) Int. Cl.[7] ............................................. G05B 19/404
(52) U.S. Cl. ........................ 700/173; 700/173; 700/166
(58) Field of Search ............................. 700/21, 26, 29, 700/30–32, 55, 54, 61, 62, 71, 79, 89, 159, 166, 160, 173, 174, 194, 195, 245, 246, 250, 251, 254, 258, 262, 306, 302; 702/84, 85, 94, 95, 182; 703/2, 6, 7; 714/100, 25, 30, 47, 48; 33/702

(56) References Cited

U.S. PATENT DOCUMENTS 4,714,339 A    12/1987   Lau et al. ..................... 356/4.5
4,819,195 A *  4/1989   Bell et al. ............... 364/571.05
6,222,628 B1 * 4/2001   Corallo et al. .............. 356/371

FOREIGN PATENT DOCUMENTS

EP    0 625 739 A1   11/1994   ............ G05B/19/18
WO    WO 97/46925    12/1997   .......... G05B/19/404

OTHER PUBLICATIONS

Soons, J.A., et al., "Modeling the errors of multi–axis machines: a general methodology," *Precision Engineering*, 1992, XP–00212–942, pp. 5–19.

Sugahara, Ryuhei, et al., Performance of a laser tracker, Smart 310, *National Library for High Energy Physics*, Hitachi Techno Engineering Co, Ltd., 1995, pp. 261–269.

Wang, S.M., et al., "Volumetric Error Compensation for Multi–Axis Machines," *1992 IEEE International Conference on Systems, Man, and Cybernetics*, Chicago, Ill., Oct. 18–21, 1992, vol. 1, pp. 183–188.

* cited by examiner

*Primary Examiner*—Leo Picard
*Assistant Examiner*—Sean Shechtman
(74) *Attorney, Agent, or Firm*—James T. Carmichael; Miles & Stockbridge P.C.

(57) ABSTRACT

A system and a process are described for performing the Static Error Compensation on numerically controlled machine tools. The process comprises the steps of: connecting a measuring laser device (5) to a numerically controlled machine tool (1); automatically sending a point 0 of the machine (1) to the laser device (5); sending commands for taking m measure points of the machine (1) from the control (3) to the laser device (5); automatically detecting the measure points and sending consolidated data from the laser device (5) to the control (3); producing a model of static errors of the machine (1); executing the Static Error Compensation depending on said produced model.

21 Claims, 3 Drawing Sheets

PROCESS AND SYSTEM FOR COMPENSATING STATIC ERRORS ON NUMERICALLY CONTROLLED MACHINE TOOLS

The present invention refers to a process and a system to realize the static error compensation on machinery in general, and particularly on numerically controlled machine tools. Examples of other types of machinery to which the present invention can be applied are measuring machines, any morphology of milling machines, electroerosion machines, plasma working machines and water-jet working machines.

The numerically controlled machine tools, after having been installed through adequate calibration operations, after a certain period of operation, show working positions that are not corresponding any more to those provided for by the control aboard the machine. These position errors are not due to a wrong operation of transducers aboard the machine, but to wrong geometries of the machine itself, assembly errors, or other reasons such as foundation settling, wear, impacts during operation, etc. In view of these disalignments between position required by control and real position reached by the tool, it should be necessary to perform machine recalibrations to bring back the machine to the "ideal" original conditions that were present upon installation.

However, so far, these recalibrations have been realised very rarely, since for them it was necessary to use costly measuring instruments. Therefore, their use has been limited to fields in which the end product cost and the necessary precision made their use acceptable, for example the fields of aeronautics and big sea engines.

A theoretical possible alternative in the art would be using, for calibration measures, a laser interferometer, that is an inexpensive instrument. However, since for these recalibrations, it is necessary to perform a very high number of measures (in the order of thousands), for each one of which the interferometer must be used for about half an hour in order to center the mirror with the laser beam, several months would be necessary to recalibrate a machine.

Therefore, currently there are no devices or systems available in the art that allow Some prior art examples of the above solutions are contained in the following documents:

WO-97-46925, that discloses a method for improving the accuracy of machines making use of interferometers;

U.S. Pat. No. 4,714,339, that discloses an interfetometer device;

EP-A-0 625 739, that discloses how to increase the accuracy of an apparatus for the movement of an object;

Wang S. M. et al, "Volumetric Error Compensation for Multi-Axis Machines", Emergent Innovations on Information Transfer Processing and Decision Making, Chicago,. Oct. 18–21, 1992, vol. 1, Oct. 18, 1992, pages 183–188, IEEE, that discloses a passive on-line software compensation method; and Sugahara R., Ohsawa Y., Araki S., Yamashita H., Matsui T.: "Performance test of a laser tracker, Smart 310", Proceedings of the Fourth International Workshop on Accelerator Alignment, vol. III, Nov. 14–17 1995, pages 261–269, Tsukuba, Japan. recalibrating a machine tool allowing to realize therefor the so-called Static Error Compensation (SEC).

Object of the present invention is solving the above prior-art problems, by providing a process and a system that allow applying the Static Error Compensation (SEC) to machinery in general and to numerically controlled machine tools in particular, through an efficient, accurate and inexpensive procedure.

The above and other objects and advantages of the invention, as will appear from the following description, are obtained by a process and a system to realize the SEC as respectively claimed in claims 1 and 12. Preferred embodiments and non-trivial variations of the present invention are claimed in the dependent Claims.

The present invention will be better described by some preferred embodiments thereof, given as a non-limiting example, with reference to the enclosed drawings, in which:

FIG. 1 is a block diagram of a preferred embodiment of the system according to the present invention;

FIG. 1A. is a more detailed block diagram of the embodiment in FIG. 1;

Figure 1:
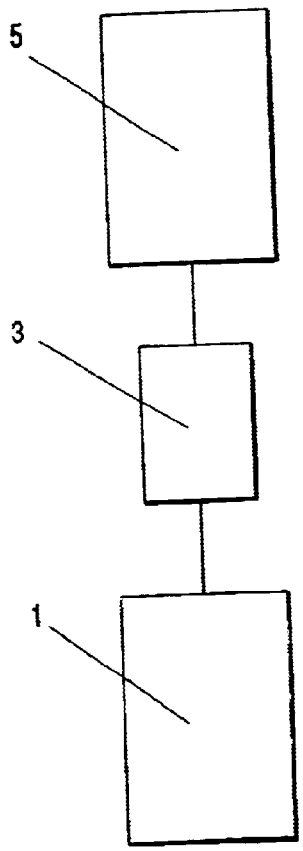

With reference to FIG. 1, a practical embodiment of the system to perform the Static Error Compensation (SEC) is shown. In FIG. 1, reference number 1 shows a traditional type of a numerically controlled machine tool, 3a control device applied to machine tool 1 in order to control its operation, and 5 a measuring laser device assembled on a numerically controlled bi-rotating head. This high-level diagram can be shown in more detail by the arrangement in FIG. 1A; therein, reference number 1 shows a traditional type of numerically controlled machine tool; 3 a control device applied to machine tool 1 in order to control its operation; 3' a static error compensating module inside the control device 3; 4 an interface between control device 3 and secondary measure system 5, that is commonly composed of a measuring laser device assembled on a numerically controlled bi-rotating head. The measuring laser device 5 is connected to the control device 3 through the module 4, with which it exchanges information and data related to the process of the present invention.

Figure 1A:
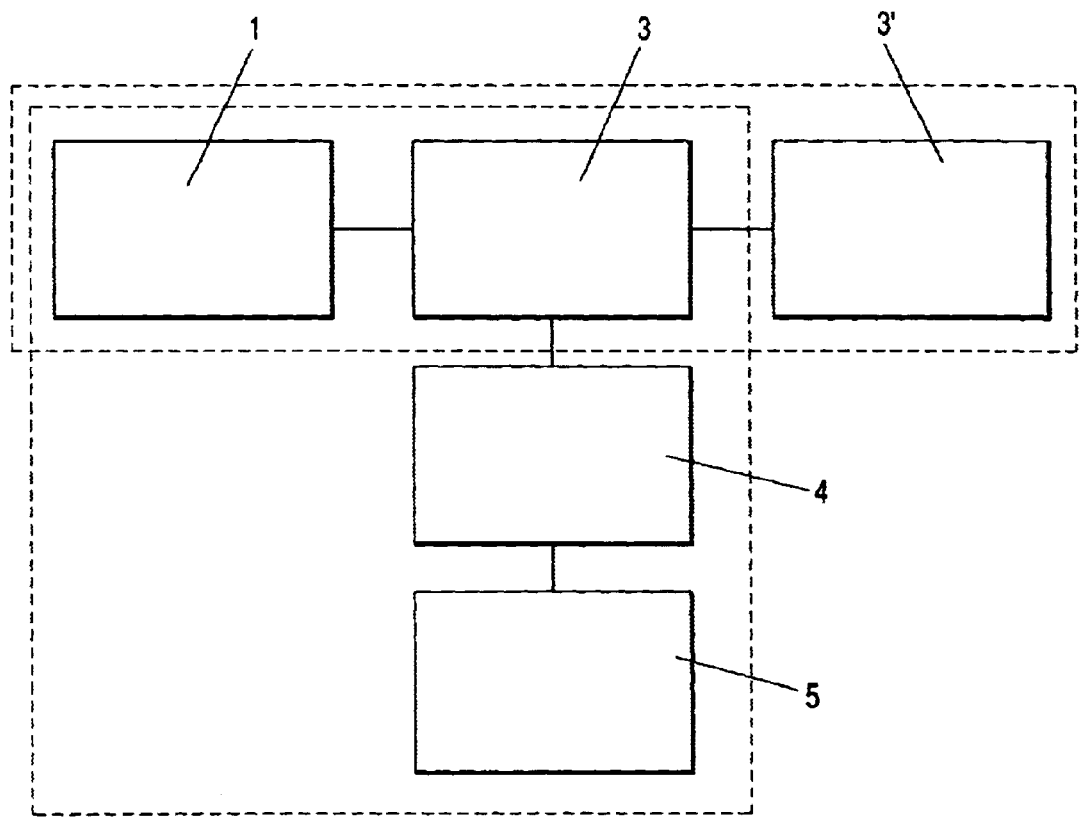

As regards the terminology used in the present document, with reference to FIG. 1A, the SEC compensating module 3 uses the so-called "Error Model", that is a spatial grid of "voxels" (terms that will be described below) and the related errors associated therewith in order to generate the error in the current machine 1 position (compensation step).

The interface 4 instead uses the so-called "Error Table", that is a data table necessary for creating the so-called "Error Matrix" for any position of the examined body with respect to its degree of freedom described by the three paired references. The term "Error Matrix", instead, means a matrix representing the degrees of freedom in terms of rigid rototranslations errors (see also FIG. 4) of a body observed from a coordinate system complying with Denavit and Hartemberg conventions. Such matrix describes the mentioned body status only in its current position with respect to the degree of freedom observed from the mentioned three local references.

As seen above, therefore, the interface 4 uses the Error Table to compute for every axis position (in practice only for the vertexes of future voxels) the Error Matrixes for every Denavit and Hartemberg reference system. Through the procedure described in the present document (derived from the kinematic Denavit and Hartemberg theory) it builds up the global static error of the machine for those determined axes positions. In this way, it builds the Error Model, in the calibration or Error Model generation step that will be described below.

Figure 2:
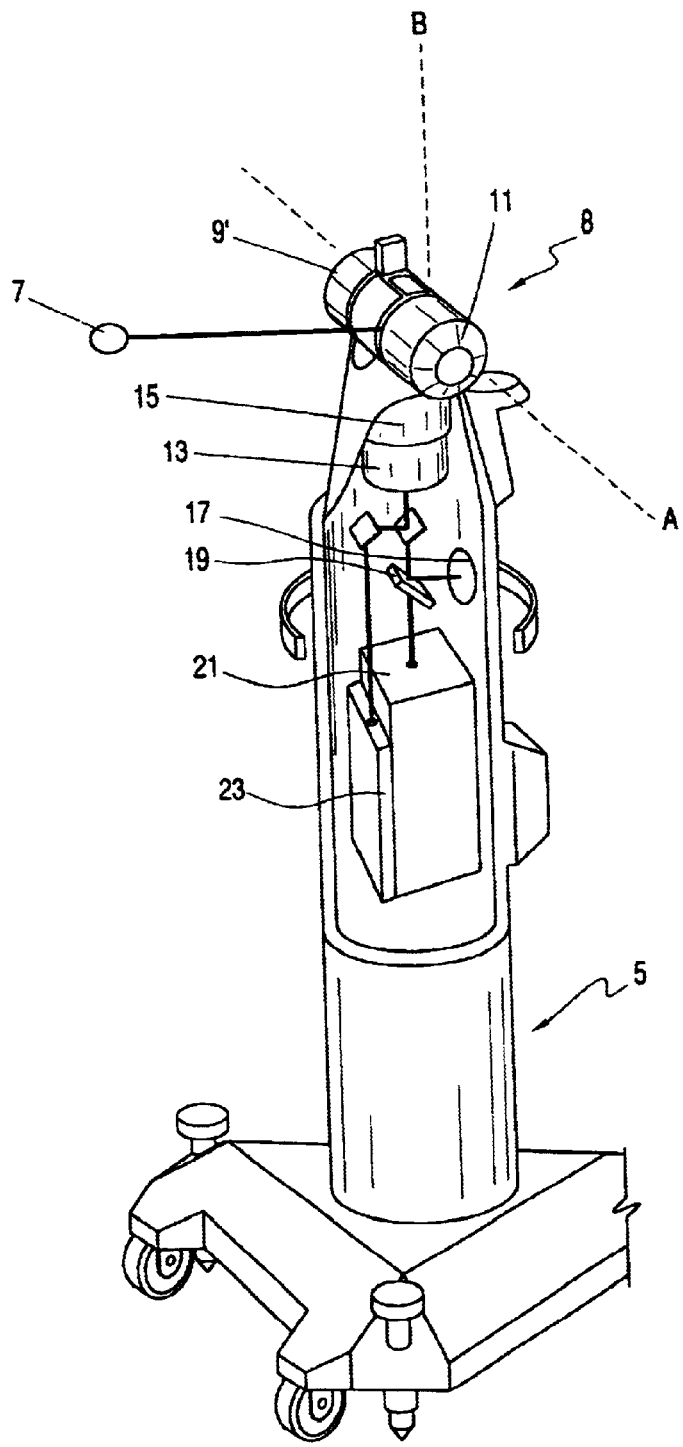
FIG. 2 is a perspective sectional view of the measuring laser device of the system in FIG. 1.

FIG. 2 is a perspective sectional view of the measuring laser device 5 of the inventive system. The device 5 shown is of the LTD500 type manufactured by company Leica AG, but other equivalent, commercially available devices are equally effectively appliable, not only as regards the operating principle (for example, systems based on photometry principles), but also as regards morphology (remote non-contact sensors). The measuring laser device 5 substantially comprises a retro-reflector 7 that in FIG. 2 is shown separated from the device 5, because it is placed on the object to be measured. In the examined case, the retro-reflector 7 is placed on the tool-holder head 9 of the machine tool 1. The device 5 further comprises a measuring head 8 containing a coder 9' operated by an engine 11 in order to rotate around a first axis A in FIG. 2, and a coder 13 operated by an engine 15 in order to rotate around a second axis B perpendicular to the first axis A. There are further provided a position detector 17, a beam splitter 19, an interferometer 21 and an absolute distance meter 23. The above-mentioned components are standard for the product shown and their operation will be described only briefly, for a better understanding of the present invention.

The device 3 uses its own measuring head 8 rotating around two axes A and B coupled with the inclined mirror 19: the coordinates are generally based on the polar point determination method, that is the laser beam direction is measured together with the distance between measuring head 8 and reflector 7. These measures are taken at a speed that can get up to 1000 times/second and are converted into the more common cartesian coordinates by an internal computer (not shown). The laser beam is backwards reflected on the laser head 8 directly along its transmission path as far as the reflector 7 does not move. When the reflector 7 moves, the transmitted laser beam does not impact any more onto the optical center of reflector 7. Instead, the reflected beam follows a parallel path according to the sliding speed. This parallel shifting is determined on the position detector 17 (that comprises a bidimensional position-sensitive photodiode inside the measuring head 8) through voltage measuring and it is broken down into any measure of the distance performed by the interferometer 21. The angle corrections computed for the inclined mirror 19 are converted into analogue signals and sent to amplifiers (not shown) of motors 11, 15 in order to point again the laser beam to the center of reflector 7. This computation is performed 3000 times per second, allowing the continuous tracking of any path. Since the retroreflector 7 moves the laser beam in parallel to the movement angle of reflector 7, the maximum tracking speed is not affected much by the distance. Like all interferometers in general, no absolute distance can be determined. It is possible to determine distance variations only—that is how much the reflector 7 moved towards or away from the measuring head 8. In order to obtain the measure of the necessary absolute distance to determine polar points, measures must always begin with the reflector 7 positioned in a point whose absolute distance is known (in the present invention this point will be called "point o"). The counting pulses of the interferometer 21 are then added or subtracted from this starting distance to execute the measures.

Figure 3:
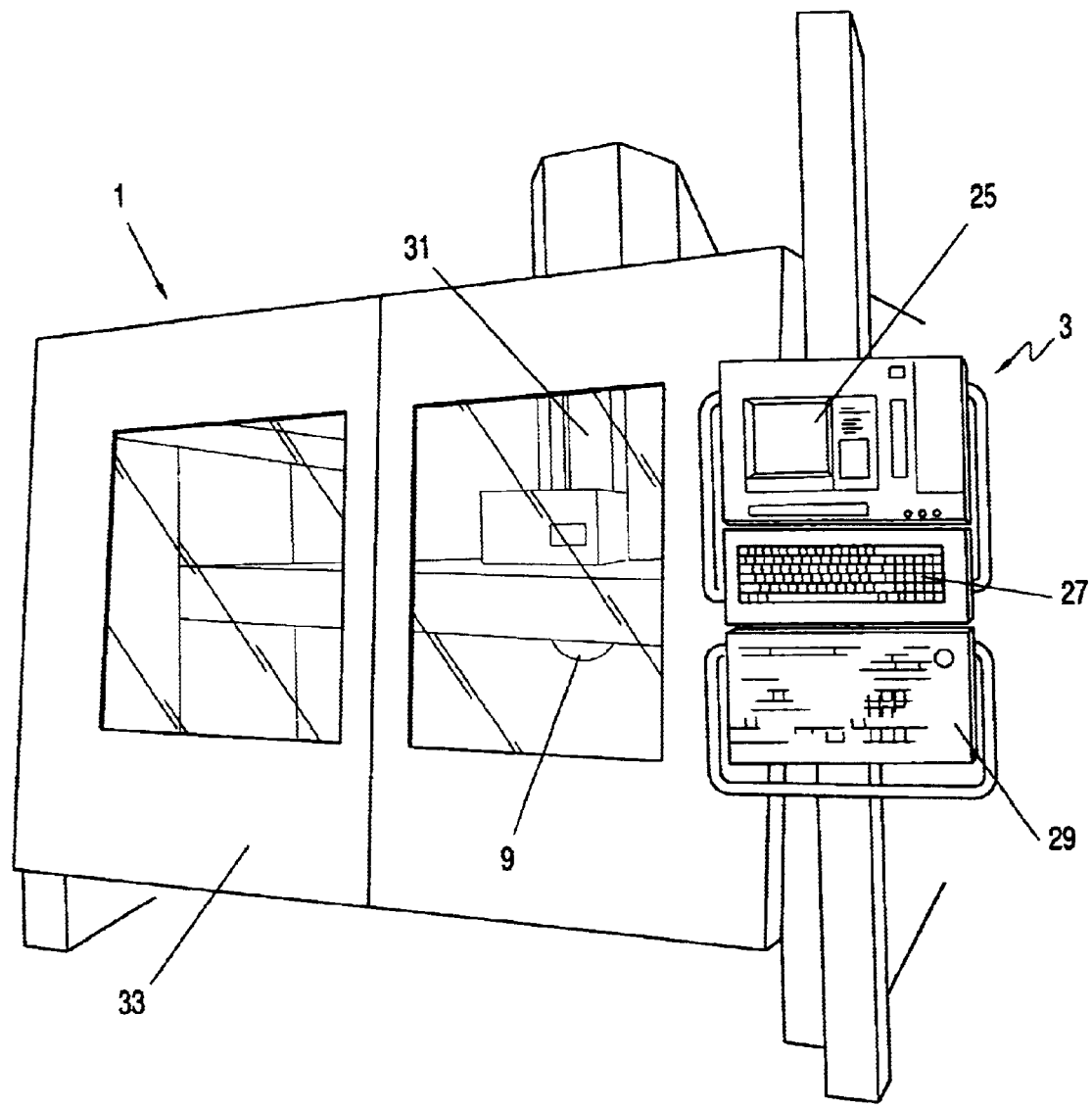
FIG. 3 is a front perspective view of a numerically controlled milling machine that is a possible part of the system of the present invention.

FIG. 3 is a schematic perspective view of a numerically controlled machine tool 1 to which the present invention can be applied, in a non-limiting way. The machine tool 1 being shown is a milling machine of the type developed by the Applicant of the present invention and thereon, in addition to the connected control device 3 (with related video 25, keyboard 27 and push-button panel 29), known components are shown such as the milling tool holder head 9, the spindle 31, together with a pair of protective doors 33. The machine tool 1 shown in FIG. 3 is of known configuration and operation and will not be further described therein.

The process performed by the above-discussed system according to the present invention will now be described in detail, with particular reference to FIG. 1A.

The connection of the measuring laser device 5 to the control device 3 of the machine tool 1 through module 4 is carried out first; after that, the point 0 transmission of the machine tool 1 from the control device 3 to the measuring laser device 5 through module 4 is automatically performed, in order to allow it to operate by measuring, as mentioned above.

Then, a command is sent to take the measure point of the machine tool 1 from the control device 3 to the measuring laser device 5: on this measure point and on the other ones being stated as effective, the correspondence controls will be made between measured values and stored values, to perform a possible future calibration (this is the static error).

The measuring laser device 5 then performs the automatic detection of the above-said measure point, by acquiring its value for a number n of times (where n by default is 500) and communicating as a result the mean value and the standard deviation (optimum index of data correctness and dispersion). If the standard deviation is too high, this means that the measure is not stable and must be repeated by removing the instability reasons (typically vibrations) or increasing the number n of acquisitions.

Every single automatical acquisition is performed in a maximum time equal to 4.5÷5 seconds.

Once having consolidated the measured point, the measuring laser device 5 sends data about such point to the control device 3 through module 4.

The previous steps of sending the command to take the point, automatically detecting and transmitting measure data m times are repeated for as many points as they are deemed necessary to perform a correct and effective measure. The parameter m depends on machine sizes and tortuosity of errors to be sampled.

When the control device 3 has available the m measure data required, it goes on producing a static error module of the machine tool 1; through this model, once determined, it will be possible to perform the Static Error Compensation (SEC).

To perform the above-described process, the control device 3 comprises a set of algorithms, currently developed through software programs written in C language, that allow performing:

calibration (setup) of the machine tool; and static error compensation of the machine, that is of those errors whose value is not affected by external agents.

As regard calibration, as already seen, the following are used in combination for the numeric control procedure: measuring system aboard the machine and the so-called "secondary absolute measuring system", that is the measuring laser device 5, in which the laser beam, emitted by the interferometer 21 and oriented by the bi-rotating head 8, is reflected in a direction that is parallel to incidence from the mirror 7 placed on the machine tool 1 replacing the tool. The knowledge of the absolute distance (by means of the interferometric beam) and the positioning angles of the bi-rotating head 8 are necessary and sufficient conditions to determine the absolute position of reflector 7 placed aside the tool.

With the above data, the software calibration procedure is activated, that comprises the following steps:

determining the sizes of a set of small elementary cubes (hereinbelow called "voxel", by analogy with the common term "pixel" used for images): a procedure based on the known Fast Fourier Transformers (FFT) techniques determines the minimum voxel size with which the geometric machine operation is described; this can be a value that is function of the machine axes position;

acquiring static errors;

collecting values of static errors for all voxel vertexes into which the working volume for machine 1 has been divided.

The static error acquisition procedure, in turn, is divided into the following steps:

issuing a reference command from the calibration software in module 4 to control 3 of machine 1;

after the machine 1 positioning, commanding the execution of a measuring cycle by the calibration software of the measuring device 5;

at the end of the measure, acquiring, by the calibration software, the measure values from the measuring system aboard the machine 1 and from the measuring device 5;

recording the difference between the values measured in the previous step as static error value related to the previously-controlled reference to control 3 of machine 1;

issuing commands related to a new reference.

As can be seen, the calibration software performs in this stage substantially the process steps previously pointed out.

The object is creating the Error Model, that is obtaining the static errors values for all vertexes of voxels composing the spatial grid describing the machine working area.

To do so, in the calibration procedure, the collection of static errors values for voxel vertexes is performed, as an alternative, or by detecting such values for all voxel vertexes in the working range of the machine 1, or by applying the following strategy:

always through the above detection cycle, acquiring the values of static errors only for a sufficient number of points, in such a way as to collect necessary information to understand the behaviour of every single machine axis.

The theoretical basis thereof is that the control device 3 controls the machine 1 depending on an ideal cartesian kinematics. In practice every axis is equipped with a more complex kinematics, because it comprises geometric errors (see FIG. 4). The object is therefore understanding the real kinematic behaviour of every axis (machine degree of freedom) (and then its real rototranslations (FIG. 4)) and then kinematically composing them to rebuild the error that the machine would assume in any position in which it guides "the tool" (or technologic actuator).

The development of such approach has its foundations in the mathematical theory of the solution of the direct robot kinematics problem. Such kinematics, based on the Denavit and Hartemberg method (1955), is able to transform every point, observed by the local triad (three references) for one axis of the machine 1, through the matrix product between the chain of local triads to the axes, into the absolute reference system. By associating every local triad with the degree of freedom of the axis to which it refers, it is possible to describe, through this set of products between matrixes, the motion of any point observed from any one of such triads. Hereinbelow a brief application example will be provided for the Denavit and Hartemberg method, assuming a triad j−1 and a triad j, respectively as local reference systems of axis j−1 and axis j integral with their degree of freedom. With these hypotheses, the position of triad j can be observed by triad j−1 through a vector that can be described through the following matrix:

Trasformation Matrix $j \rightarrow j-1$ $$\begin{pmatrix} \cos(\theta_j) & -\sin(\theta_j)\cdot\cos(\alpha_j) & \sin(\theta_j)\cdot\sin(\alpha_j) & a_j\cdot\cos(\theta_j) \\ \sin(\theta_j) & \cos(\theta_j)\cdot\cos(\alpha_j) & -\cos(\theta_j)\cdot\sin(\alpha_j) & a_j\cdot\sin(\theta_j) \\ 0 & \sin(\alpha_j) & \cos(\alpha_j) & d_j \\ 0 & 0 & 0 & 1 \end{pmatrix}$$

where θ is the degree of freedom of j. By pre-multiplying the vector describing the position of a point observed with respect to triad j, for transforming matrix j→j−1 a vector is obtained that describes the position of such point observed by triad j−1. The set of multiplications of transforming matrixes allows transforming a local reference into a global one by going up again into the kinematic chain being examined.

Then, the description of the geometric machine behaviour is performed by composing the errors, through interpositions, to the above set of multiplications to transform a tool point into the absolute reference system, before every transforming matrix, of an "Error Matrix", that describes the static errors generated by the axis movement with which said matrix is associated for certain positions of the above axis (or degree of freedom).

The error matrix, in an identical way to the transforming one, is such that, depending on the position value of the axis to which it is referred, it manages to describe the axis rototranslation errors only. As previously mentioned, the only measure of necessary points suitable to provide necessary information to understand the behaviour of every single machine axis, allows computing, through such methodology, the static errors values in any point of the machine working area and therefore in voxel vertexes.

Figure 4:
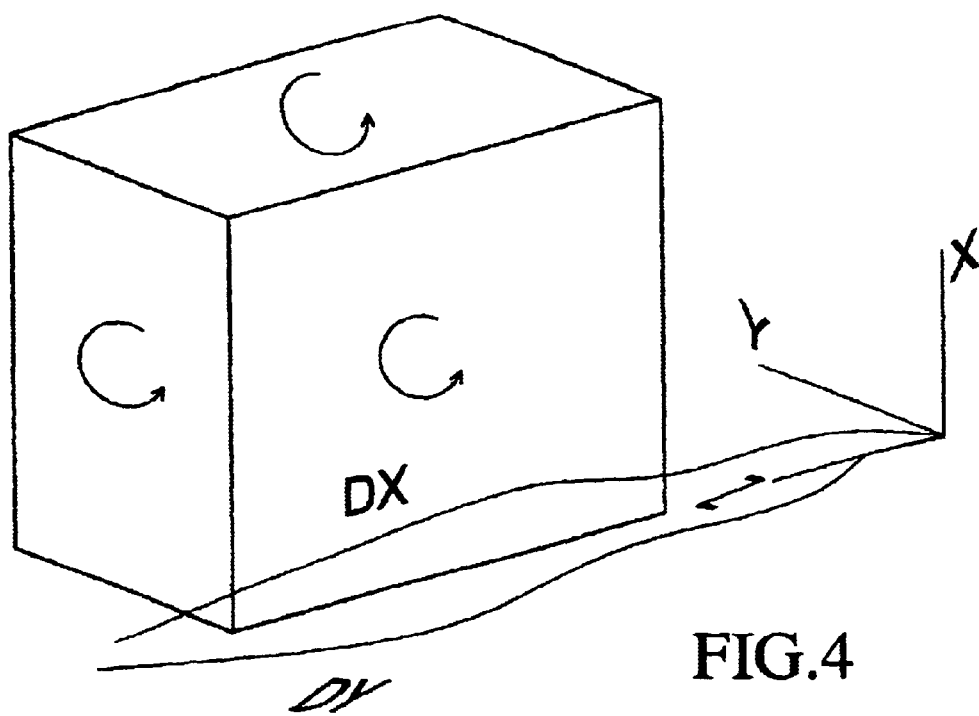
FIG. 4 shows an application example of the error matrix employed in the process of the present invention.

With reference to FIG. 4, it will be described in more detail how for every degree of freedom position, it is possible to create/assemble the error matrix. As already said, the error matrix is that set of necessary information to describe, with respect to a predetermined reference system, the rototranslation errors of a body equipped with a degree of freedom in a certain predetermined position thereof with respect to such degree of freedom. The reference system, suitably positioned according to Denavit and Hartemberg conventions, observes and describes the degree of freedom of the examined body. Based on the position of such body, the error matrix is generated. The necessary information to generate the error matrix are contained in an error table.

As shown in FIG. 4, the body shown is equipped with a degree of freedom that is described and observed by the local triad shown in the figure. Axis Z of the local triad identifies such degree of freedom. $D_y$ and $D_x$ represent the static errors for such body. These errors are function of height Z. Obviously, there exist a Dz too that has not been shown in the figure.

The knowledge of such errors, in a determined number of points in height Z, allows filling-in the

TABLE I

| Position (Z value) | Dx | Dy | Dz | Da | Db | Dc |
|---|---|---|---|---|---|---|
| "position to which the errors refer" ... | "as previously mentioned" ... | "as previously mentioned" ... | "as previously mentioned" ... | Angular positioning error with resp. to axis X ... | Angular positioning error with res to axis Y ... | Angular positioning error with resp. to axis Z ... |

The knowledge of height Z allows searching in error tables those necessary information to rebuild the real position of the examined body with respect to the local triad referred to its degree of freedom.

These information are translated into a matrix through Denavit and Hartemberg conventions. Therefore, the error matrix is created related to the current Z position of the examined body.

By pre-multiplying the error matrix obtained for the transforming matrixes, it is possible to transform the errors in the absolute reference system. Such transformation further allows taking into account the lever effect of axes positions with respect to angular errors.

Through such procedure, it is then possible to describe errors in an open kinematic chain. The necessary condition for that purpose is that the single error matrixes for the single axes describe only the errors related to such axis, exactly as if the further degrees of freedom of the machine were free from errors. In other words, this is a geometric error decomposition of a kinematic system. The basis for such decomposition is locating the error reasons.

Once this is known, it is then possible to virtually evaluate (that is without performing a direct measure but simply adopting the previously described procedure) the static error value in any machine position. This procedure is then adopted to compute the error values in all voxels vertexes building in such a way the Error Model (necessary for the module 3 in FIG. 1 for the compensation step).

As regards the static error compensation of the machine 1, the software program that is able to perform it, is structured in such a way as to include the error model containing the static errors values in certain positions of the machine 1; based on such table, the procedure allows computing and thereby compensating with enough speed the machine static errors. The compensation speed is enough if the compensation module is able to perform the static error compensation in a useful period such as to produce a better geometric behaviour of the machine with respect to the case of lack of compensation.

Depending on the previously defined "enough speed" concept, the compensation module acquires the values of the measuring system aboard the machine, and processes, based on values included in the error model, the static error value corresponding to the current machine position provided through acquisition.

The procedure and data structure are as follows: the error module dscribes in a discrete way the machine 1 errors in its working volume. Therefore it consists in a spatial grid/grate for whose vertexes the static error value of the machine 1 is available if the measuring system aboard the machine points out that the tool is positioned in such point. The machine working area is then "made discrete" into a set of voxels, for all of which in the eight vertexes the error value is available, exactly as mentioned before.

Therefore, depending on the real machine position, known from the previous step, the compensating module searches for the voxel that contains such point. Once the address of such voxel is known, it computes through linear interpolations the static error value in the really interesting point, starting from the eight available values for the voxel vertexes and knowing the machine position thereinto.

Finally, filtering operations are performed, to avoid sudden variations in the behaviour of the imposed compensations, and then the compensation is performed, by forcing the machine 1 to be positioned into the space in a point given by the algebraic sum of the acquired values and the previously processed values (measured position+error).

What is claimed is:

1. Process for performing a Static Error Compensation on machines, particularly numerically controlled machine tools, comprising the following steps:
   a. connecting a measuring laser device (5) to a control device (3) of a numerically controlled machine (1);
   b. positioning a reflector (7) of said measuring laser device (5) in a point whose absolute distance is known, said point being called point 0 for measures, and automatically sending the point 0 of said machine (1) from said control device (3) to said measuring laser device (5);
   c. sending a command for taking a measure point of said machine (1) from said control device (3) to said measuring laser device (5);
   d. automatically detecting said measure point by said measuring laser device (5) after n times from which no variations from said point occurred;
   e. sending data regarding said point of said machine (1) detected by said measuring laser device (5) to said control device (3);
   f. repeating the previous steps from c) to e) for m measure points;
   g. producing a model of static errors of said numerically controlled machine (1); and
   h. executing a Static Error Compensation (SEC) depending on said produced model,
   wherein said step (g) of producing a model comprises the following steps:
      g1. determining the sizes of small elementary cubes (volume elements=voxels) through a procedure based on FFT techniques that determines the minimum voxel size with which the geometric operation of machine (1) is described;
      g2. acquiring static errors;
      g3. collecting values of static errors for all voxel vertexes into which the working volume for machine (1) has been divided;
   and wherein said step (h) of executing a SEC depending on said produced model comprises the following steps:
      h1. providing an error table containing the static errors values in predetermined positions of the machine (1);
      h2. based on said error table, computing and then compensating the static errors of the machine (1), with such a compensation speed as to be able to perform the compensation of a static error in a useful period in order to produce a better geometric behaviour of the machine (1) with respect to the case of lack of compensation;

h3. acquiring the values of the measuring system aboard the machine;

h4. processing, based on the values contained in said error table, the static error value corresponding to the current position of the machine provided through the acquiring step.

2. Process according to claim 1, characterised in that said step (g2) of acquiring static errors comprises the following sub-steps:

g2-1. issuing a reference command from a calibration software to the control device (3) of the machine (1);

g2-2. after the positioning of the machine (1), commanding the execution of a measuring cycle by the calibration software to the measuring device;

g2-3. at the end of the measure, acquiring, by the calibration software, the measure values from the measuring system aboard the machine (1) and from the measuring device (5);

g2-4. recording the difference between the values measured in the previous step as static error value related to the previously-controlled reference to the control device (3) of the machine (1); and g2-5. issuing commands related to a new reference.

3. Process according to claim 1, characterised in that said step (g3) of collecting values of static errors for the voxel vertexes is performed by detecting such values for all voxel vertexes in the working range of the machine (1).

4. Process according to claim 1, characterised in that said step (g3) of collecting values of static errors for the voxel vertexes comprises the following sub-steps:

acquiring the values of the static errors only for a sufficient number of points, in such a way as to collect necessary information to understand the behaviour of every single axis of the machine (1); and describing the geometric behaviour of the machine (1).

5. Process according to claim 4, characterised in that said sub-step of acquiring the values of part of the points is based on the mathematical theory of the solution of the direct robot kinematics problem, and is able to transform every point, observed by the local reference triad to an axis of the machine (1), through the matrix product between the chain of local triads for axes, into the absolute reference system, said theory, associating every local triad with the degree of freedom of the axis to which it is referred, being able to describe, through this set of matrix products, the motion of any point observed by any one of such triads.

6. Process according to claim 4, characterised in that said step of describing the geometric behaviour of the machine (1) is performed by interposing, before every transforming matrix, an error matrix to said set of multiplications to transform a tool point into the absolute reference system, said error matrix being of an identical form as said transforming matrix and describing the static errors generated by the axis movement with which said matrix is associated, said error matrix being such to describe, based on the position value of the axis to which it is referred, only the axis rototranslation errors.

7. Process according to claim 1, characterised in that said error table describes in a discrete way the errors of the machine (1) in its working volume, said error table comprising a spatial grid/grate for whose vertexes the static error value of the machine (1) is available if the measuring system aboard the machine points out that the tool is positioned in such point.

8. Process according to claim 1, characterised in that said step (h) of executing a SEC depending on said produced model further comprises the following sub-steps:

making the working area of the machine (1) discrete in a set of voxels, the error value being available in the eight vertexes of all said voxels;

based on the real position of the machine (1), searching for the voxel that contains such point;

computing, through linear interpolations, the static error value in the interesting point, starting from the eight values available for voxel vertexes and knowing the machine position thereinto;

filtering, in order to avoid sudden variations in the behaviour of imposed compensations; and compensating the errors, said compensating step being performed by forcing the machine (1) to be positioned in the space of a point given by the algebraic sum of the acquired values and the previously processed values (measured position+error).

9. Process according to claim 1, characterised in that n is commonly equal to 500.

10. Process according to claim 1, characterised in that m depends on machine sizes and on tortuosity of errors to be sampled.

11. Process according to claim 1, characterised in that said automatically detecting step d) is performed in a time varying between 4.5 and 5 seconds.

12. System for performing a Static Error Compensation on machines, particularly numerically controlled machine tools, comprising:

a numerically controlled machine (1);

a control device (3) connected to said machine (1) and adapted to control the operation of said machine (1); and a measuring laser device (5) assembled on a numerically controlled bi-rotating head (8), said measuring leaser device (5) being connected to said control device (3), a reflector (7) of said measuring laser device (5) being positioned in a point whose absolute distance is known, said point being-called point 0 for measures;

characterised in that said control device (3) is adapted to perform the following steps:

automatically sending the point 0 of said machine (1) to said measuring laser device (5);

sending a command for taking a measure point of said machine (1) to said measuring laser device (5);

automatically detecting said measure point by said measuring laser device (5) after n times from which no variations from said point occurred;

receiving data regarding said point of said machine (1) detected by said measuring laser device (5);

repeating the previous steps for m measure points;

producing a model of static errors of said numerically controlled machine (1); and executing a Static Error Compensation (SEC) depending on said produced model, and in that said control device (3) comprises calibration means adapted to perform the step of producing a model, said step comprising the following sub-steps:

determining the sizes of small elementary cubes (volume elements=voxels) through a procedure based on FFT techniques that determines the minimum voxel size with which the geometric operation of machine (1) is described;

acquiring static errors;

collecting values of static errors for all voxel vertexes into which the working volume for machine (1) has been divided;

and in that said control device (3) comprises static error compensation means that are adapted to perform the step of executing a SEC depending on said produced model, said step comprising the following sub-steps:

providing an error table containing the static errors values in predetermined positions of the machine (1);

based on said error table, computing and then compensating the static errors of the machine (1), with such a compensation speed as to be able to perform the compensation of a static error in a useful period in order to produce a better geometric behaviour of the machine (1) with respect to the case of lack of compensation;

acquiring the values of the measuring system aboard the machine;

processing, based on the values contained in said error table, the static error value corresponding to the current position of the machine provided through the acquiring step.

13. System according to claim 12, characterised in that said step of acquiring static errors comprises the following sub-steps:

issuing a reference command from a calibration software to the control device (3) of the machine (1);

after the positioning of the machine (1), commanding the execution of a measuring cycle by the calibration software to the measuring device (5);

at the end of the measure, acquiring, by the calibration software, the measure values from the measuring system aboard the machine (1) and from the measuring device (5);

recording the difference between the values measured in the previous step as static error value related to the previously-controlled reference to the control device (3) of the machine (1); and issuing commands related to a new reference.

14. System according to claim 12, characterised in that said numerically controlled machine (1) is a milling machine.

15. System according to claim 12, characterised in that said measuring laser device (5) substantially comprises:

a retroreflector (7) connected to a tool-holder head (9) of said machine (1);

a measuring head (8) containing a coder (9') operated by a motor (11) in such a way as to rotate around a first axis (A), and a coder (13) operated by a motor (15) in such a way as to rotate around a second axis (B) perpendicular to said first axis (A);

a position detector (17);

a beam splitter (19);

an interferometer (21); and an absolute distance meter (23).

16. System according to claim 12, characterised in that said step of collecting values of static errors for the voxel vertexes is performed by detecting such values for all voxel vertexes in the working range of the machine (1).

17. System according to claim 12, characterised in that said step of collecting values of static errors for the voxel vertexes is performed through the following steps:

acquiring the values of the static errors only for a sufficient number of points, in such a way as to collect necessary information to understand the behaviour of every single axis of the machine (1); and describing the geometric behaviour of the machine (1).

18. System according to claim 17, characterised in that said step of acquiring the values of part of the points is based on the mathematical theory of the solution of the direct robot kinematics problem, and is able to transform every point, observed by the local reference triad to an axis of the machine (1), through the matrix product between the chain of local triads for axes, into the absolute reference system, said theory, associating every local triad with the degree of freedom of the axis to which it is referred, being able to describe, through this set of matrix products, the motion of any point observed by any one of such triads.

19. System according to claim 17, characterised in that said step of describing the geometric behaviour of the machine (1) is performed by interposing, before every transforming matrix, an error matrix to said set of multiplications to transform a tool point into the absolute reference system, said error matrix being of an identical form as said transforming matrix and describing the static errors generated by the axis movement with which said matrix is associated, said error matrix being such to describe, based on the position value of the axis to which it is referred, only the axis rototranslation errors.

20. System according to claim 12, characterised in that said error table describes in a discrete way the errors of the machine (1) in its working volume, said error table comprising a spatial grid/grate for whose vertexes the static error value of the machine (1) is available if the measuring system aboard the machine points out that the tool is positioned in such point.

21. System according to claim 11, characterised in that said static error compensating means are further able to perform the steps of:

making the working area of the machine (1) discrete in a set of voxels, the error value being available in the eight vertexes of all said voxels;

based on the real position of the machine (1), searching for the voxel that contains such point;

computing, through linear interpolations, the static error value in the interesting point, starting from the eight values available for voxel vertexes and knowing the machine position thereinto;

filtering, in order to avoid sudden variations in the behaviour of imposed compensations; and compensating the errors, said compensating step being performed by forcing the machine (1) to be positioned in the space of a point given by the algebraic sum of the acquired values and the previously processed values (measured position+error).

* * * * *